United States Patent [19]

Gottlieb

[11] 4,057,888
[45] Nov. 15, 1977

[54] NUT DRIVING ASSEMBLY APPARATUS

[75] Inventor: Robert G. Gottlieb, Prairie Village, Kans.

[73] Assignee: Lewis Industries, Inc., Kansas City, Mo.

[21] Appl. No.: 712,928

[22] Filed: Aug. 9, 1976

[51] Int. Cl.² .......................................... B23P 19/04
[52] U.S. Cl. .................................................. 29/240
[58] Field of Search ....................... 29/240; 81/57.37; 10/155 R

[56] References Cited

U.S. PATENT DOCUMENTS

| | | | |
|---|---|---|---|
| 1,431,493 | 10/1922 | Thomas | 10/155 R |
| 1,551,591 | 9/1925 | Thomas | 10/155 R |
| 1,565,685 | 12/1925 | Thomas | 10/155 R |
| 1,906,078 | 4/1933 | Morgan et al. | 10/155 R |
| 2,763,173 | 9/1956 | Bailey et al. | 10/155 R |
| 2,943,335 | 7/1960 | Daniel et al. | 10/155 R |

Primary Examiner—James L. Jones, Jr.
Attorney, Agent, or Firm—Fishburn, Gold & Litman

[57] ABSTRACT

Apparatus is disclosed for interconnection of threaded members such as nuts and bolts. Components can be used in combination whereby nuts and bolts are automatically supplied, properly aligned, and threaded together for rapid assembly on parts having preformed openings for the bolts.

17 Claims, 10 Drawing Figures

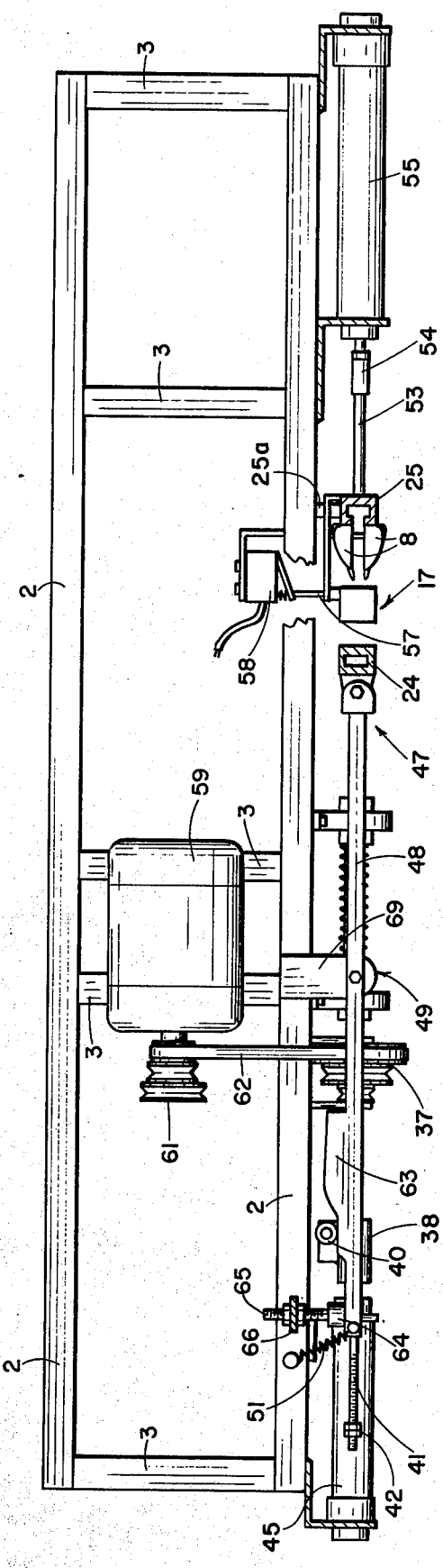
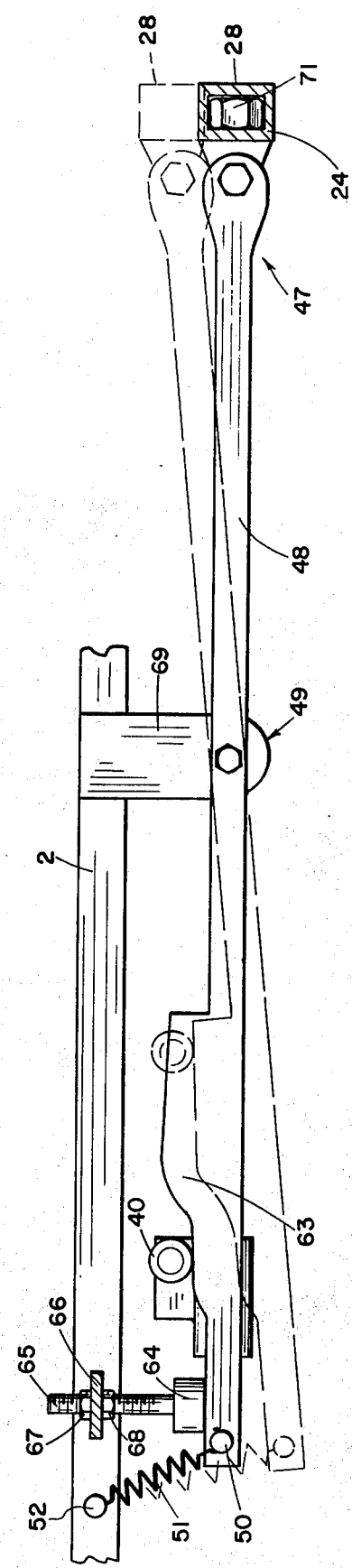
Fig. 2
Fig. 5

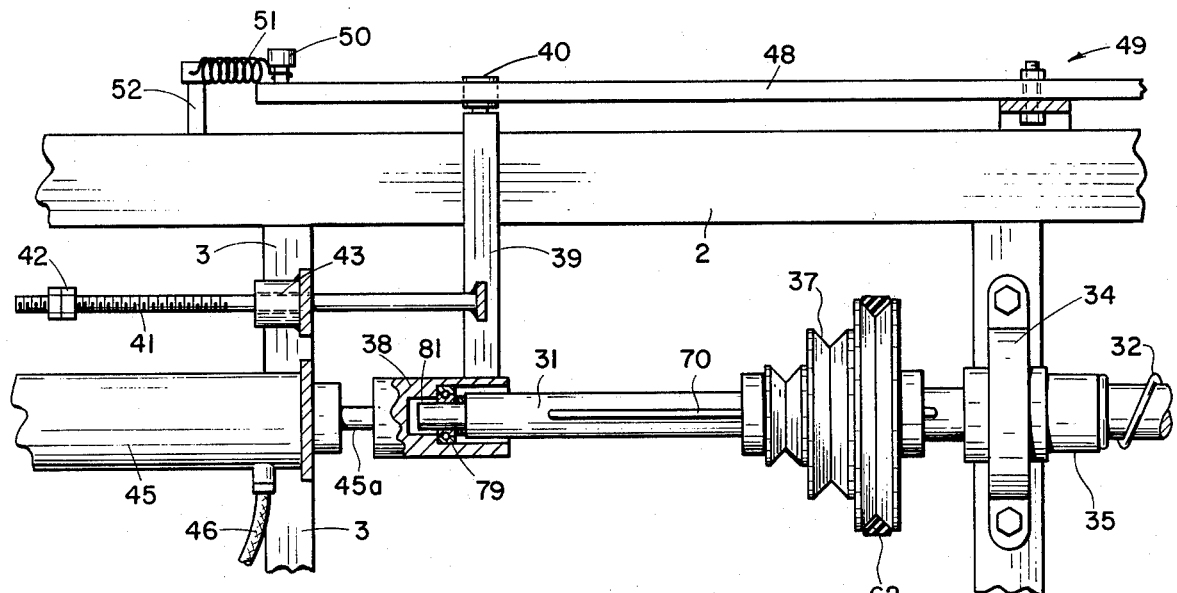
Fig. 4
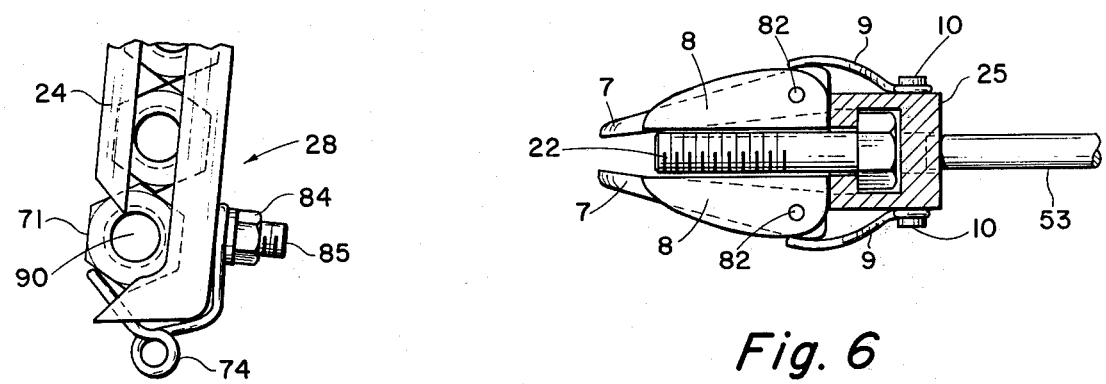
Fig. 9
Fig. 6
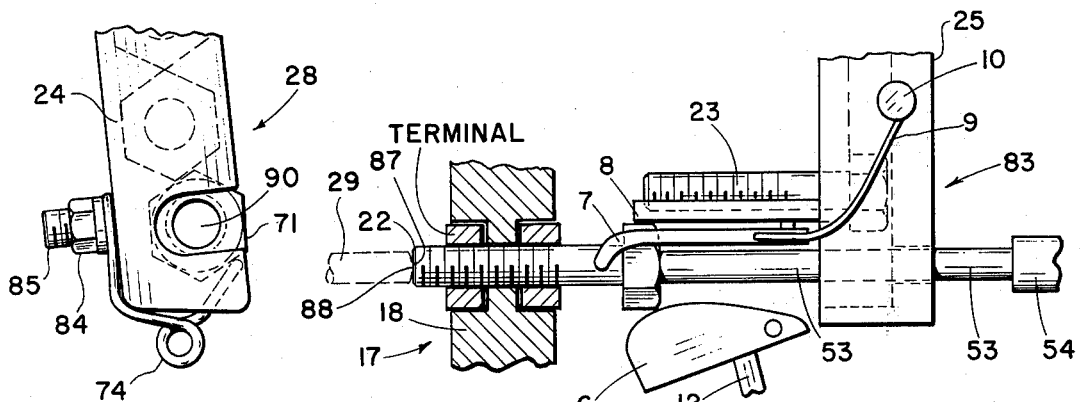
Fig. 8
Fig. 7

NUT DRIVING ASSEMBLY APPARATUS

BACKGROUND OF THE INVENTION

The present invention pertains to apparatus for interconnection of members by means of matching threads, and more particularly pertains to an assembly apparatus for rapid interconnection of threaded members such as nuts and bolts. In one specific respect, the present invention pertains to an improved nut driver having a retractable nut spindle which extends through a nut holder on the outer end of the driver.

During high speed assembly operations wherein bolts are placed into preformed holes and nuts are then screwed onto the bolts, there is a need for apparatus which can automatically insert bolts in the holes and then apply nuts thereto, thus greatly increasing the rate at which such operations can be performed.

Among the components which can be useful in interconnecting nuts with bolts is a nut driver having means for gripping a nut so as to prevent free rotation thereof during attachment to a bolt, and also a nut spindle which passes through the threaded central channel of the nut and which retracts into the channel to make room for the shank of a bolt being installed therein. One form of nut driver having means for holding a nut and a spindle which passes through the central channel therein is disclosed in U.S. Pat. No. 3,489,041 to Hauenstein et al, but it should be noted that the spindle disclosed therein has an outer end portion that is shaped to fit into the hollow interior of a socket-like stud. Accordingly, the outermost tip of the spindle is not adapted for contact with the external end face on an ordinary screw, bolt, or stud that is not hollow, nor is the outermost tip adapted to retract through the threaded central channel of a nut being driven in order to make room for the bolt onto which the nut is screwed. It should also be noted that the manner of turning nuts on bolts as disclosed by Hauenstein et al involves use of ribs on a rotating member which engage notches in the nut, e.g. a notched circular nut as is used for securing a headphone jack in place. There is thus no recess on the driver into which the nut can fit, and no means are disclosed for holding and tightening hexagonal nuts. As a consequence, the nut driver disclosed in U.S. Pat. No. 3,489,041 is not regarded to be altogether satisfactory for interconnecting ordinary varieties of threaded nuts and bolts.

One object of the present invention is, therefore, to provide means for rapidly interconnecting first and second members that have matching threads, such as nuts and bolts, while also providing improved means for spindling and holding one of the first members while it is being threadedly interconnected with one of the second members.

Another object is to provide an assembly means which aligns a first and a second member having matching threads, and which then interconnects the two members by means of their threads.

Still another object is to provide assembly means for screwing nuts onto bolts, and including feed means whereby nuts and bolts are supplied to the assembly means one at a time and at a desired rate.

Yet another object is to provide means that can be actuated at will to automatically perform a sequence of steps whereby a nut and a bolt are displaced from respective feed means therefor and are then interconnected by means of their threads.

Even another object is to provide an improved nut driver for installing nuts on bolts, screws, studs, and the like.

Other objects and advantages of the present invention will become apparent from the following description and the accompanying drawings, but it will be understood that other accordant embodiments of the invention will become apparent which are not described and shown herein.

SUMMARY OF THE INVENTION

The present invention is an apparatus for assembling a first member having internal threads with a second member having external threads, by interconnection of the threads. The present apparatus comprises a holding means whereby free rotation of said first member is prevented during interconnection with the second member, and further comprises a spindle which extends through said holding means and through said first member, being held thereby. The spindle has an outermost tip which contacts said second member and which retracts through said first member upon interconnection of the two members by means of their threads.

In accordance with the present invention, apparatus for assembling nuts on bolts can be provided which comprises a first magazine for holding a supply of nuts, a second magazine for holding a supply of bolts, a nut holding means having an axially retractable, outwardly projecting nut spindle, a thrusting means for driving bolts out of the second magazine and toward an outermost tip on the spindle, driving means for conveying the spindle axially through the central opening of a nut held in the first magazine and for conveying the holding means into engagement with the spindled nut, and means for rotating either one of the spindled nut or bolt driven from the magazine for interconnection of the two by means of their threads.

BRIEF DESCRIPTION OF THE DRAWINGS

FIG. 2 is a top view of the apparatus shown in FIG. 1

FIG. 4 is an enlarged, fragmented front view of the apparatus shown in FIGS. 1 and 2, and illustrating in particular some of the drive components of the apparatus.

FIG. 5 is an enlarged, fragmented top view of the apparatus in FIGS. 1 and 2, and illustrating in particular a positioning means for the nut-feeding magazine of the apparatus.

FIG. 6 is a top view of bolt feeding and aligning apparatus that is associated with the bolt feeding magazine of the apparatus.

FIG. 7 is a side view of the apparatus shown in FIG. 6.

FIG. 8 is a view of one side of the nut-feeding end of the nut magazine used with the apparatus shown in FIGS. 1 and 2.

FIG. 9 is a side view, opposite to that shown in FIG. 8, of the nut magazine used with the apparatus shown in FIGS. 1 and 2.

DESCRIPTION OF PREFERRED AND ALTERNATIVE EMBODIMENTS

Figures 1, 10:
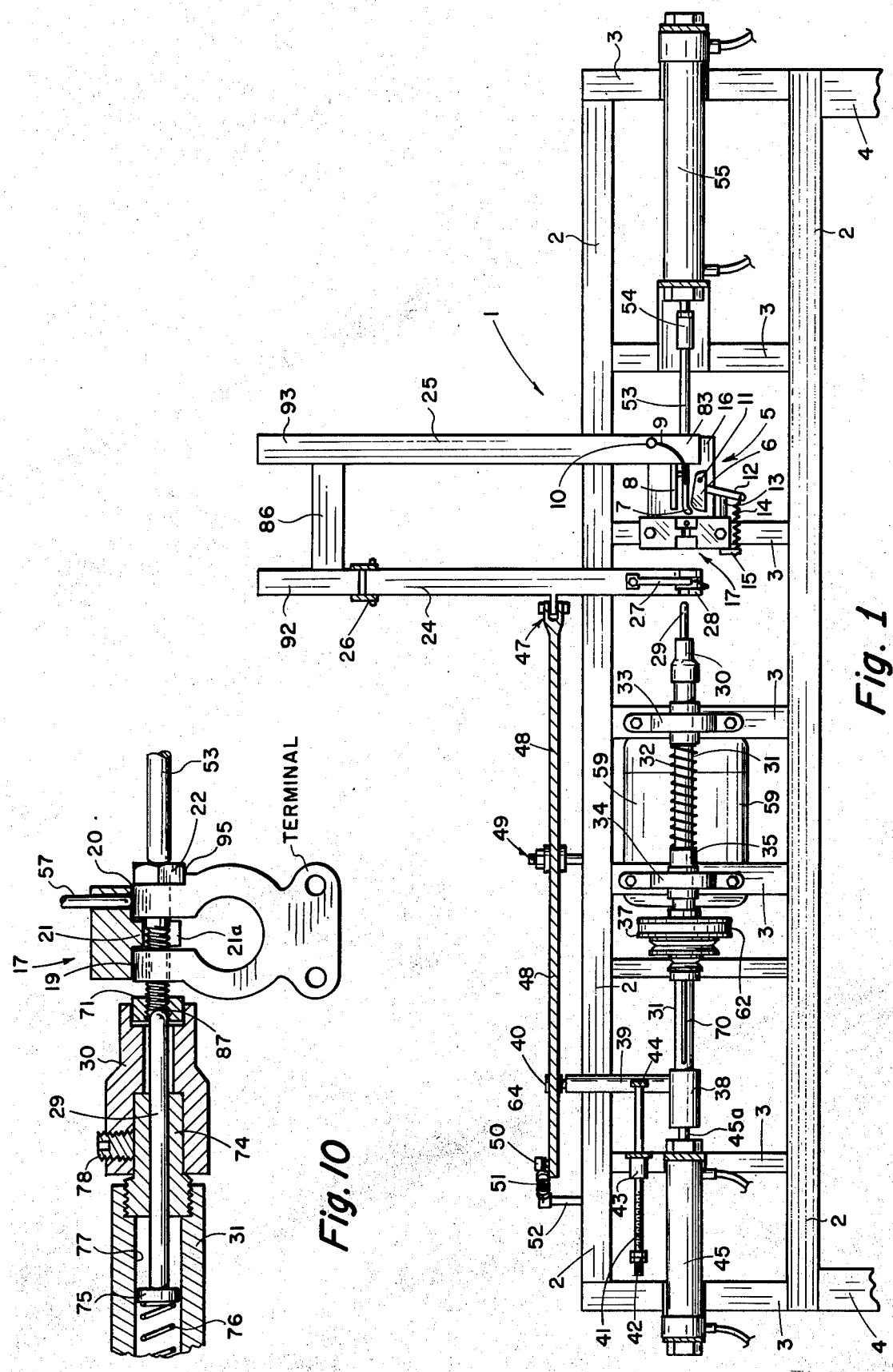
FIG. 1 is a front view of an assembly apparatus constructed in accordance with the present invention.
FIG. 10 is a sectional plan view showing a nut during feeding onto the threads of a bolt.

The apparatus shown in the drawings can be used for rapid assembly of nuts and bolts on suitable receiving members, in this example, terminals for automotive battery cables. Accordingly, a first threaded member in the form of a nut is assembled onto a second threaded member in the form of a bolt which has been inserted into an opening therefor in the terminal. The internal threads of the nut thus reside within a central channel therein, and the nut is aligned by the apparatus so that this central channel is aligned axially with an external end face on the shank of the bolt, and hence is properly aligned with the external threads thereon which extend from the face.

Referring to FIGS. 1 and 2, the frame of the assembly apparatus is generally represented at 1 and comprises longitudinal member 2, braces and supports 3 and legs 4. Alignment means for bolts, which is generally represented at 5, comprises a cradle 6 which pivots up and down, sliders 7 which pivot laterally, and stationary aligning lugs 8. The sliders 7 are continuously urged inwardly toward a bolt in the alignment means by means of springs 9, one end of which is affixed to the bolt magazine 25 by means of a retainer pin 10. The large end of cradle 6 swings up and down on pivot pin 11, and is provided with a lever arm 12 and a tensioned spring 14 so that it is constantly urged to swing upward, but to a limited extend determined by the lever arm stop pin 13. The pivot pin 11 for the cradle 6 is affixed to a rigid plate which extends outwardly from one of the crossbraces 3, thus providing stabilization and support for the cradle. Other members of the bolt alignment means 5, such as sliders 7, lugs 8 and springs 9 are attached to the bolt magazine 25, the latter being rigidly attached to one of the longitudinal frame members by brace 25a.

An anvil represented at 17 serves as receiving holder for a battery cable terminal that is inserted into the anvil when a bolt and nut is to be assembled on the terminal. The anvil is mounted on one of the crossbraces 3 and comprises a main body portion 18, lateral indentions 19 and 20 to receive the lugs of an inserted terminal, and an intermediate spacer 21 between the indentions. The width of the spacer roughly corresponds to the width of the desired gap between the lugs of a battery terminal after installation of a nut and bolt thereon. The spacer has a recess 21a therein to accommodate a bolt inserted in a battery terminal while in the anvil, but this recess being open to the outside to permit removal of the terminal from the anvil following installation of a bolt.

Figure 3:
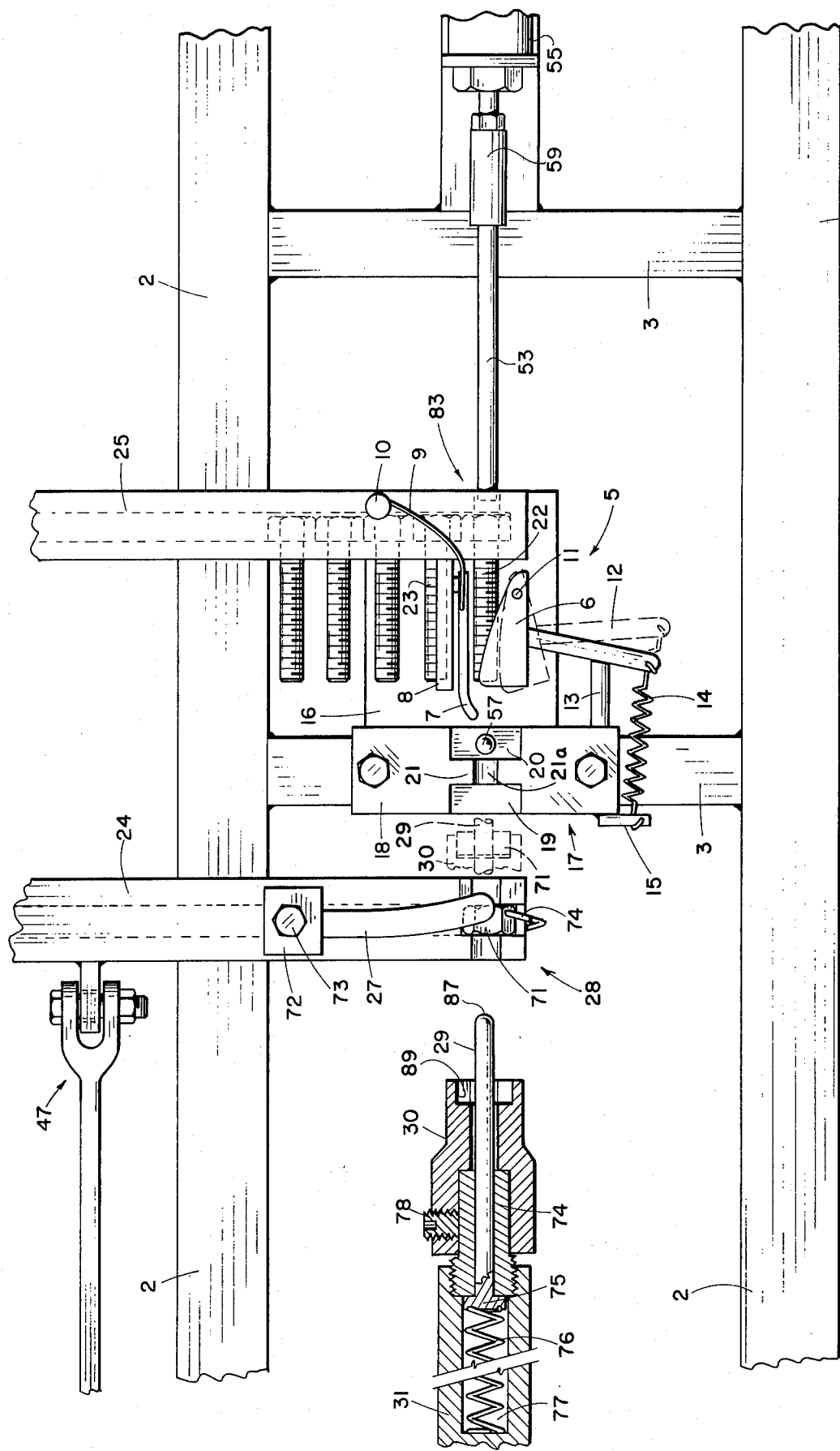
FIG. 3 is an enlarged, fragmented front view of the apparatus shown in FIGS. 1 and 2, and illustrating in particular the components of the apparatus whereby nuts and bolts are fed, aligned and screwed together.

Referring to FIG. 3, bolts are fed to the alignment means 5 and anvil 17 from a bolt magazine 25 having a loading end 93 and a bolt feeding end 83. As shown in FIG. 3, bolt 22 has reached the feed end 83 of the magazine and is about to be displaced therefrom by use of a thrusting means which comprises a bolt displacement pin 53 attached by a coupling 59 to a hydraulic or pneumatic cylinder 55. One end of pin 53 passes through an opening in the rear wall of the magazine 25 and is axially aligned with the head of bolt 22, so that upon actuation of the cylinder 55 the pin pushes the bolt out of an opening in the front wall of the magazine and into the terminal received in the anvil, FIGS. 7 and 10. FIG. 7 shows the downward pivoting of cradle 6 and engagement of the bolt with the sliders 7. During movement of bolt 22 toward the anvil 17, it is supported from below for proper alignment with the anvil by cradle 6, and is prevented from lateral misalignment by the sliders 7 which pivot laterally on pins 82 to accommodate the head of the bolt. Once the bolt 22 has been inserted into the battery terminal and the nut is driven thereon, cylinder 55 is depressurized, pin 53 retracts, the cradle 6 swings upward, and the next bolt 23 falls into the cradle preparatory to the next assembly sequence. Bolt 23 is guided by lugs 8 in its downward travel to assure proper alignment with sliders 7 and cradle 6. The edges of the lugs adjacent the shanks of the bolts can be beveled as a further aid to guiding the bolts.

Having described the feeding of bolts to the anvil 17, description will now be directed to the manner in which nuts are fed and delivered to the bolts. In FIGS. 1 and 2, the nut magazine 24 is attached at its upper end to bolt magazine 25 by means of a rigid brace 86, and has a nut loading end 92 and a nut feeding end 28. The nut magazine 24 is further provided with a pivot 26 so that the nut feeding end 28 thereof is pivotable rearwardly, i.e., upwardly with respect to the viewer as seen in FIG. 5. The nut feeding end also has other provisions which will be described subsequently since they are functional in the alignment and conveying of nuts to the anvil.

A nut spindle 29 and a nut holder 30 are attached to a rotatable thrust rod 31. The thrust rod is stabilized against lateral movement by pillow block bearings 33 and 34, but is slidable axially in the bearings so that the nut holder 30 and spindle 29 can be moved back and forth along the longitudinal axis of the thrust rod, and hence back and forth with respect to the feeding end of the nut magazine 24 and the anvil 17. The spindle has an outermost tip 87 which is axially aligned with the recess 21a of the anvil and is hence directed toward contact with an external end face 88 (FIG. 7) on the shank of a bolt which has been placed in the anvil, the end face thereby being axially aligned with the outermost tip 87 of the spindle. As was previously indicated, the bolt has external threads 89 on the shank which extend from the end face 88 a sufficient distance so that a nut can be attached to it.

The thrust rod 31 and the attached spindle 29 and nut holder 30 are provided with means for driving them longitudinally as well as rotatively. The rotative drive means includes an electric motor 59 having a pulley 61 thereon, a pulley 37 on thrust rod 31, and a belt 62 whereby rotary motion is transferred to the thrust rod from the motor. The longitudinal drive means comprises a hydrauic or pneumatic cylinder 45 which has a plunger 45a bearing against the outer end of a housing 38 containing a thrust bearing having an outer race 79 fitted into the housing and an inner race 80 fitted onto a mount 81 at the end of the thrust rod 31. Travel of the thrust rod toward the nut magazine and the anvil are limited by means of a threaded limiter rod 41 which is attached at its inner end to brace 39, which is in turn attached to housing 38 which moves longitudinally with the thrust rod. The limiter rod extends rearwardly through a guide 43 attached to a cross brace 3 which guide also serves as a stop for the rod. Forward travel of limiter rod 41, and hence of thrust rod 31, is determined by the location of nuts 42 on the limiter rod. Travel of the thrust rod toward the nut magazine and anvil increases in length as the nuts are screwed further toward the end of the limiter rod, and vice versa. Accordingly, the travel of the thrust rod toward the anvil can thus be precisely regulated.

The thrust rod 31 is provided with spline 70 so that by means of a corresponding keyway in pulley 37 the rod can be moved longitudinally through the pulley while still being rotated by it. A coiled spring 32 extends over the surface of the thrust rod between bearings 33 and 34. One end of the spring rests against the inner race of frame mounted bearing 33, whereas the other end rests against a collar 35 longitudinally fixed to the thrust rod. When the thrust rod is moved longitudinally toward the nut magazine and the anvil, the spring becomes compressed, and assists in moving the thrust rod in the other direction once a nut has been delivered to the anvil by means of the spindle and nut holder.

When the spindle and nut holder are moved toward a bolt in the anvil, a nut is first picked up from the nut magazine 24 by the spindle, then delivered into engagement with the nut holder, and subsequently the nut feeding end 28 of the magazine is displaced to the rear so that it does not obstruct further movement of the spindle and nut holder toward the anvil. Displacement of the magazine to the rear and its subsequent return to the front for realignment with the spindle and nut holder is accomplished with positioning means comprising a lever arm 48 which is attached by means of a pivot joint 47 to the nut magazine 24 below its pivot 26. The lever arm also has a pivot joint 49 toward the middle thereof, attached to a strut 69 (FIG. 5) on a frame member 2. The other end of the lever arm is provided with a biasing spring 51 which is attached to retainer pins 50 and 52 on the arm and the frame 1, respectively, whereby the arm is continuously urged to pivot the magazine forward, i.e. toward the viewer as seen in FIG. 1.

Forward travel of the lower end of the nut magazine is limited and is adjustable by a lever arm stopping means comprising an arm rest 64, a threaded limiter rod 65, a rigid post 66 on frame member 2, and nuts 67 and 68 on the limiter rod. By adjustment of nuts 67 and 68, distance through which the spring biased end can move rearwardly, and hence the position at which the nut feeding end of the magazine will normally reside forwardly, can be precisely adjusted for alignment with the nut spindle.

Automatic displacement of the feed end of the nut magazine rearwardly following the spindling of a nut is effected by use of a cam 63 and cam follower roller 40 which are part of the positioning means. When the thrust rod is moved longitudinally by means of the cylinder 45, the cam follower roller 40 is caused to move in the same direction since it is attached to bearing housing 38 of the thrust rod. This causes the cam follower roller to engage the cam 63 on the lever arm 48, hence causing the spring biased end of the arm to move forwardly and the other end to move rearwardly, and further causing the lower end of the nut magazine to swing rearwardly and out of the way of the nut holder 30 and thrust rod 31. By properly shaping cam 63, the magazine can be caused to swing out of the way following spindling of a nut, and it will swing to a sufficient distance rearwardly so that it is not in the way of the nut holder 30 which continues to move toward the anvil. When the thrust rod moves away from the anvil following the installation of a nut on a bolt, the tension in spring 51 causes the lower end of the magazine to swing forwardly for realignment with the spindle and nut holder. The feeding end 28 of the nut magazine is thus pivoted back and forth laterally with respect to the longitudinal axis of the thrust rod by actuation of the pivoting means when the thrust rod is moved back and forth along its axis.

In FIGS. 3 and 10 the spindle and the nut holder are shown in greater detail. Both are mounted coaxially on one end of the thrust rod 31, and the spindle 29 has an outermost tip 87 which projects axially outward from the nut holder 30 and thus normally resides outwardly therefrom. The other end of the spindle is provided with a cap 75 of enlarged diameter. The nut holder 30 is fastened to one end of an adapter 74 by means of a set screw 78, and the other end of the adapter is screwed into the outer end of thrust rod 31 by means of threads. There is a well 77 in the outer end of the thrust rod which accommodates a coiled spring 76. One end of the spring bears against the bottom of the well whereas the other end bears against the cap 75 of the spindle. In the illustrated case, the outermost end 91 of the nut holder is a nut-gripping end in the form of a hexagonal socket having a recess 89 into which a hexagonal nut 71 is inserted and held for installation on a bolt 22.

The spindle extends axially through a channel in the adapter 74 and axially through the recess 89 of the socket. The spindle has a length provision so that when it is depressed against spring 76 it can retract far enough back into the recess 89 of the nut holder 30 for the outermost tip 87 thereof to withdraw from the threaded central passageway of a nut within the holder during attachment of the nut to a bolt. Accordingly, the outermost tip 87 is normally held outward beyond the gripping end of the holding means for the nut by use of the biasing spring 76 and is caused to retract inwardly from the external end face of a bolt on which the nut is being installed.

FIGS. 8 and 9 show the nut feeding end 28 of the magazine 24 is greater detail. FIG. 8 shows the side of the nut feeding end which faces the spindle and the nut holder, whereas FIG. 9 shows the side which faces the anvil. The front and sides of the feeding end are slotted at the sides and the front to facilitate displacement of a nut 71 therefrom after it has been spindled. Clip spring 74 serves as retainer for a nut being fed until its retaining effect is overridden as the magazine swings rearward. The internally threaded central channel 90 of a nut 71 about to be fed is therefore held in coaxial alignment with the spindle 29 by the nut magazine, and subsequently fed nuts are also thus aligned when they drop to fill the void.

In making use of the assembly apparatus shown in the drawings, the magazines 24 and 25 are first loaded with nuts and bolts, respectively, and it will be understood that such loading can be accomplished by hand or with a continuous or semi-continuous feeder such as a vibratory feeder. Activation of an assembly operation is effected by inserting a battery terminal into the indentions 19 and 20 of the anvil 17, resulting in depression of the plunger 57 of a microswitch 58, signaling other circuitry, not shown, including a sequence timer, to cause the cylinders 45 and 55 to extend and retrace in predetermined timed sequence for displacement of a bolt and a nut from their respective magazines and the delivery thereof to the terminal. Motor 59 preferably runs continuously for rotation of the nut holder 30, but can be caused to run intermittently in response to actuation of microswitch 58.

As described, cylinder 55, through pin 53, displaces a bolt from magazine 25 and delivers it into the appropriate holes in a battery terminal at the anvil, where, if desired, the arrival of the bolt may be sensed by suitable means (not shown) for control confirmation. Delivery of a nut to the bolt is accomplished by passage of the spindle 29 through the central opening 90 of the nut 71 in the magazine, and immediately thereafter the swinging of the lower end of the magazine rearward is initiated by the positioning means, but the magazine does not move completely out of the way of the nut holder and spindle until a leaf spring wiper 27, fastened to magazine 24 by clip 72 and bolt 73, has urged the spindled nut into the recess 89 of the nut holder. Subsequently, the spindle and the nut holder approach the anvil, with first contact being made by the outermost tip of the spindle against the external end face 88 on the shank of bolt 22. As holder 30 and the nut therein approach the end of the bolt, the spindle retracts through the central passageway of the nut and continues to do so even after the bolt has passed all the way through the nut passageway.

When the nut contacts the bolt, there is immediate engagement of the threads of the two. Turning of bolt 22 is prevented by a flat shoulder 95 on the battery terminal which bears against a corresponding shoulder on the head of the bolt. Before the nut has been run all the way down on the bolt, advancement of the nut holder toward the anvil is ceased by means of limiter rod 41. As a consequence, continued threading of the nut onto the bolt causes the nut to be withdrawn from the recess 89 of the nut holder, and the turning thereof ceases as it is withdrawn completely from the holder. By adjustment of limiter rod 41, a desired degree of nut run-down can be accomplished. The withdrawal of the assembled terminal from the anvil releases pressure on microswitch plunger 57, readying the apparatus for the next cycle.

Even though the apparatus is adapted for rotating a nut for interconnection with the threads of a bolt that does not turn, it will be appreciated that essentially the same nut holder and spindle arrangement can be used without substantial rotation thereof, i.e. the bolt can be turned instead of the nut. It will further be appreciated that the invention can be adapted for use with various types of internally and externally threaded fasteners, e.g. screws, studs, and nuts other than hexagonal nuts and can be used for assembly thereof on suitable articles other than battery terminals. Additionally, although it is preferred that the holding means for a first threaded member, such as a nut, have a recess into which said first member is inserted and held, nonrecessed holding means can also be employed, for example external ridges, lugs or other types of gripping faces may be indicated for particular applications.

An assembly apparatus which accomplishes the previously stated objects has now been described in detail, and even though the invention has been described with reference to particular apparatus, combinations of apparatus, operating sequences, threaded members, applications of use, and the like, it will nonetheless be understood that still other embodiments will become apparent which are within the spirit and scope of the invention defined in the following claims.

What is claimed and desired to secure by Letters Patent is:

1. An apparatus for assembling a first member having a central channel with internal threads and a second member having a shank with external threads, by interconnection of the threads, said apparatus comprising:
   a. a thrust rod having a longitudinal axis, said rod being rotatable and moveable back and forth on said axis yet stabilized against lateral movement with respect thereto,
   b. holding means mounted on one end of said thrust rod, said holding means having a gripping end that meshes with said first member,
   c. a spindle which extends through said holding means and through said first member enmeshed by said gripping end of the holding means, said spindle having an outermost tip which contacts said second member and which retracts through said first member upon interconnection of the two members by means of their threads, and
   d. thrusting means whereby said shank of the second member is urged axially toward said central opening of the first member.

2. Apparatus as in claim 1 wherein said holding means comprises an elongated passageway through which said spindle extends axially and wherein the spindle is slidable back and forth for moving said outermost tip thereof inwardly and outwardly with respect to said gripping end, and biasing means whereby said spindle is continuously urged outwardly with respect to said gripping end of the holding means.

3. Apparatus as in claim 2 wherein said holding means and said spindle are coaxially mounted on one end of said thrust rod, and wherein the outermost tip of said spindle projects axially outward from said holding means.

4. Apparatus as in claim 1 wherein said outermost tip of the spindle is normally held outward beyond said gripping end of the holding means by said biasing means, and is caused to retract inwardly from the gripping end upon being pushed against said external face of said second member during threaded interconnection with said first member.

5. Apparatus as in claim 4 wherein said gripping end of the holding means comprises a recess into which said first member is inserted and held for interconnection with said second member by means of the threads.

6. Apparatus as in claim 5 wherein said outermost tip of the spindle retracts into said recess during threaded interconnection of said first and second members.

7. Apparatus as in claim 1 and further comprising driving means whereby said thrust rod is moved back and forth along its longitudinal axis.

8. Apparatus as in claim 1 and further comprising a magazine for containing a plurality of said first members and for feeding them one at a time to said spindle and holding means, and a positioning means whereby one of said first members in the magazine is positioned so that the central channel therein is aligned axially with said spindle when said thrust rod is in a rearward position, and whereby said magazine is displaced from said first member when said spindle is inserted into the central channel thereof by movement of said thrust rod to a forward position.

9. Apparatus as in claim 8 wherein said magazine is an elongated chute having a loading end and a feeding end for said first members, said chute being pivoted between the ends, and wherein said feeding end is pivoted back and forth laterally with respect to the longitudinal axis of the thrust rod by actuating of said positioning means.

10. Apparatus as in claim 1 and further comprising alignment means whereby the longitudinal axis of said shank of the second member is coaxially aligned with said central channel of said first member for threaded interconnection of the two.

11. Apparatus as in claim 1 and further comprising actuating means whereby said thrust rod and said thrusting means are actuated for bringing said first and second members into contact with each other.

12. Apparatus as in claim 10 and further comprising rotating means whereby said thrust rod is rotated on its longitudinal thrust axis for rotation of said first member during threaded interconnection thereof with said second member.

13. Apparatus as in claim 10 and further comprising a magazine for containing a plurality of said second members and for feeding them one at a time to said alignment means with said external face on the shank of the second member directed toward said outermost end of the spindle.

14. Apparatus for assembling threaded nuts on threaded bolts which comprises:
  a. a first magazine for holding a supply of nuts,
  b. a second magazine for holding a supply of bolts,
  c. a nut holding means having an axially retractable, outwardly projecting nut spindle,
  d. a bolt thrusting means for driving bolts out of the second magazine and toward an outermost tip on said spindle, and
  e. a thrust rod that is both rotatable and moveable back and forth on its longitudinal axis for conveying said spindle axially through the central opening of a nut held in the first magazine, for conveying said holding means into engagement with said nut, and for screwing said nut onto a bolt driven from said second magazine by said bolt thrusting means.

15. Apparatus as in claim 14 wherein said outermost tip on the spindle is axially aligned with the threaded central channel of a nut in the first magazine.

16. Apparatus as in claim 14 and further comprising alignment means whereby the shank of a bolt is axially aligned with said outermost tip of the spindle upon driving the bolt from the second magazine by the thrusting means.

17. Apparatus as in claim 14 and further comprising positioning means whereby said first magazine is positioned for axial alignment of a central channel of a nut therein with said spindle, and whereby said first magazine is displaced from engagement with said nut upon passage of said spindle through the central channel thereof.

* * * * *